(12) United States Patent
Franz, Jr.

(10) Patent No.: US 11,985,123 B2
(45) Date of Patent: May 14, 2024

(54) SYSTEM AND METHOD FOR GENERATING AND USING DIGITAL TIME TOKENS

(71) Applicant: Richard Thomas Franz, Jr., Boulder, CO (US)

(72) Inventor: Richard Thomas Franz, Jr., Boulder, CO (US)

(73) Assignee: Richard T. Franz, Jr., Boulder, CO (US)

( * ) Notice: Subject to any disclaimer, the term of this patent is extended or adjusted under 35 U.S.C. 154(b) by 330 days.

(21) Appl. No.: 16/946,026

(22) Filed: Jun. 3, 2020

(65) Prior Publication Data

US 2021/0385211 A1    Dec. 9, 2021

Related U.S. Application Data

(60) Provisional application No. 62/969,146, filed on Feb. 2, 2020.

(51) Int. Cl.
*H04L 9/40*    (2022.01)
*G06F 1/14*    (2006.01)
*G06F 16/23*    (2019.01)
*G06Q 10/10*    (2023.01)

(52) U.S. Cl.
CPC ............ *H04L 63/0853* (2013.01); *G06F 1/14* (2013.01); *G06F 16/2379* (2019.01); *G06Q 10/10* (2013.01)

(58) Field of Classification Search
CPC ....... G06F 16/2379; G06F 1/14; H04L 51/18; H04L 51/58; G06Q 20/123; G06Q 20/384; G06Q 20/401; G06Q 10/10
See application file for complete search history.

(56) References Cited

U.S. PATENT DOCUMENTS

| | | | |
|---|---|---|---|
| 10,785,201 B2* | 9/2020 | Bhimanaik | H04L 63/0815 |
| 2020/0226587 A1* | 7/2020 | Platt | G06Q 20/3672 |
| 2021/0042830 A1* | 2/2021 | Burke | G06Q 20/341 |
| 2021/0073212 A1* | 3/2021 | Conley | G06Q 20/4014 |

\* cited by examiner

*Primary Examiner* — Marcin R Filipczyk (57) ABSTRACT

Systems and methods for generating one or more digital tokens for transmission among users is disclosed. The method comprises the steps of connecting a user to a computer based system via a set of login credentials. Further, the user is allowed to select one or more digital tokens to be sent to other users. Further, one or more users are selected as recipients. A value is determined for the one or more tokens to be sent to the other users. Furthermore, a set of content is input into a message associated with the one or more tokens. The tokens along with the message are transmitted from one user to the other. Upon successful transmission, the method updates one or more account balances for the one or more users and/or recipients.

15 Claims, 5 Drawing Sheets

SYSTEM AND METHOD FOR GENERATING AND USING DIGITAL TIME TOKENS

RELATED APPLICATIONS

This application claims the benefit of provisional patent application Ser. No. 62/969,146 filed Feb. 2, 2020, the disclosure of which is hereby incorporated herein by reference in its entirety.

TECHNICAL FIELD

The present disclosure relates to a system and method for generating and exchanging digital time tokens based on a unit measurement of time. Specifically, this disclosure relates to a platform that allows users to give digital time tokens representing a unit of their time to other users.

BACKGROUND

Commonly in the industry, entities and people are constantly interfacing via user platforms, groups, and advertising sponsors. Ultimately, users seemingly have an endless number of options when it comes to interacting with the digital world. There are virtually millions of digital media objects and activities at their fingertips such as videos, music, games, websites, social media platforms and virtual worlds. In addition, the advances in computing makes it possible to personalize digital content for users, not only by bringing user specific content of their liking (such as streaming music, videos, loading games, websites, advertisements or virtual worlds), but also generating content specifically tailored to their taste (e.g., by rendering specific images in videos or games). Most importantly, online platforms allow users to interface with one another, developing relationships, collaborate effectively, and to establish positive communication through encouraged user engagement.

Popular conventional social network non-text-based communications allow users to provide feedback and express their feelings and interact with others published content by using one or more methods. The first method is the binary method, where a user can choose or not choose to enable a "like button", "arrow up/arrow down" or "heart" icon, etc. Secondly, the user can provide expression by using a capped rating method based on a sliding scale, wherein the user selects a rating value within a predefine range. For example, by clicking on a star icon representing a value between one to five stars. Each of these stars provide for rating. One star indicates a poor rating and 5 stars represents the most positive rating assessment available to express how someone feels towards a subject, a business, service, news or an individual's published content. Third, a graphical feature that allows a person to select from a limited number of predefined images or characters icons. For example, Emoji/Emoticons, that are designed to represent feelings, emotions, a mood or convey the intended tone of the sender and which may have dual meaning and therefore must be interpreted correctly by the receiver. None of these conventional method of social network non-written communications features a binary, capped rating system or predefined icons, which allows a person to express themselves by giving a representation of their time which has implied value due to its ubiquitous nature and the universal understanding of time as a limited resource. Furthermore, in conventional communication systems the measurement of the individual's expression is range bound or subject to interpretation. This can take place either as a quantified response or as a fixed response, with some capped numeric value, or by reliance on the receiver to interpret the sender's selected icon or grouping of icons.

Thus, there is a need to foster and create positive user communication and influence in order to engage users to facilitate giving, kindness and growth that will benefit society.

SUMMARY

The present disclosure provides a new method and system that allows users to communicate to others by sending quantifiable messages based on the value of their time and by allowing user to give time tokens in any amount that does not exceed their available time token balance. Systems and methods for generating and exchanging digital time tokens based on a unit measurement of time are disclosed. Embodiments described herein discloses a method of operation to generate one or more digital tokens for transmission. The method includes connecting to a third-party social network via a set of login credentials. The method includes selecting one or more tokens to send to one or more users. The method includes selecting one or more users as recipients. The method includes determining a value of the one or more tokens to be sent to the one or more users. The method includes inputting a set of content into a message associated with the one or more tokens. The method includes updating one or more account balances for the one or more users and/or recipients.

In one embodiment, the message is configured to be sent with a privacy level.

In one embodiment, the message is sent anonymously.

In one embodiment, the set of content is configured to be one or more of text, one or more badges, one or more photos, or one or more web links.

In one embodiment, the one or more recipients is selected from a friends list, a system user list or a categorical topic list.

In one embodiment, the third party social network is selected from one or more of social media, intranet, a blog, or an advertising platform.

The disclosure further provides a method which facilitates positive and quantifiable communications between platform users by allowing users to give digital time tokens representing a unit of their time to others users via the platform's time token transaction messaging system. System users can acknowledge others and express themselves in a more quantifiable way than conventional communication systems by giving time tokens that represents a specific quantity of their time. System users include; individual users, groups, specific topics and social causes monitored by an individual user and platform advertising sponsors. System digital tokens are generated by the time token engine module and are distributed to users based on a defined unit measurement of time. One embodiment of using time as a method to generate a digital token's value is to use the duration of time an individual has been a registered user of the system platform. Digital time tokens based on an individual user time are distributed equally by the time token engine module to all system users at the same valuation and intervals for the specific purpose of creating a positive account balance and so that tokens are available to be given to other system users in the form of a time token transaction message. All registered user can initiate, send and/or receive a token transaction message. A token transaction message consists of; a time token numeric value amount determined by the sender to be transferred to the message recipient and various message options including the ability to add: a written text message, virtual badges depicting various award types and media content in the form of digital photographs, video and/or other content internet address link.

As users receive time tokens in messages and their received time balance increases to a point whereby, they have a sufficient balance for token redemption, the user may elect to redeem some or all of their received token balance for promotional reward items made available by platform advertising sponsors.

System data metrics at the user level are provided to track various token transaction metrics, including; user's giving history, user's received history, award badge type distribution, time token balances and user ranking based on given, received and redeemed tokens activity.

For a fee, the system allows advertising sponsors to initiate promotional campaigns and to communicate and interact directly with platform users by running advertising campaigns which may include promotional items that can be offered at various quantities and token redemption values to facilities users engagement with sponsor's promotional content. Eligible system users that have enough received time tokens (tokens sent to their account by other users and not by the time token engine) can acquire listed reward items by transferring their received time tokens to the sponsor in exchange for the promotional item. Promotional reward items offered by sponsors may take the form of: gift cards, coupons, event tickets, music, mobile software applications, electronic books, games, a donation to a non-profit or any other item that can be delivered electronically, physically and/or managed by the system token redemption module. A unique feature of the platform is the ability for a user to redeem time tokens for a sponsor item and then initiate an act of kindness by transferring their redeemed item in a pay it forward (PIF) transaction to another system user.

The invention's digital time token methodology and token transaction messaging system facilitates communication and provides quantifiable feedback based on the ubiquitous and fixed nature of the value of time which is unique compared to established social media communications software and feedback options.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

The invention will hereinafter be described in conjunction with the appended drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed towards a method of operation to generate one or more digital tokens for transmission. The method includes connecting to computer system via a set of login credentials. The method includes selecting one or more tokens to send to one or more users. The method includes selecting one or more users as recipients. The method includes determining a value of the one or more tokens to be sent to the one or more users. The method includes inputting a set of content into a message associated with the one or more tokens. The method includes updating one or more account balances for the one or more users and/or recipients.

Additionally, the present disclosure provides for a method and system to generate and exchange digital time tokens to facilitate quantitative communications by using a network accessible system that has multiple users and interfaces with other external devices and social networks. Accordingly, the embodiments described herein of the present invention are illustrative only and is not intended to be in anyway limiting. In the different embodiments, the techniques described herein can be run on a server computer or a client computer or both.

The method in general is configured for generating and exchanging digital time tokens based on a unit measurement of time. This method can further include distributing, giving, receiving, storing, redeeming digital time tokens to facilitate positive and quantifiable communications between platform users, groups and advertising sponsors. Accordingly, the system can enable one or more people to monetize a representation of time by converting their actual recorded system user time into a digital token with transferable value to others, whereby the receiving party can redeem time tokens received for advertising sponsor's promotional items and rewards.

Figure 1:
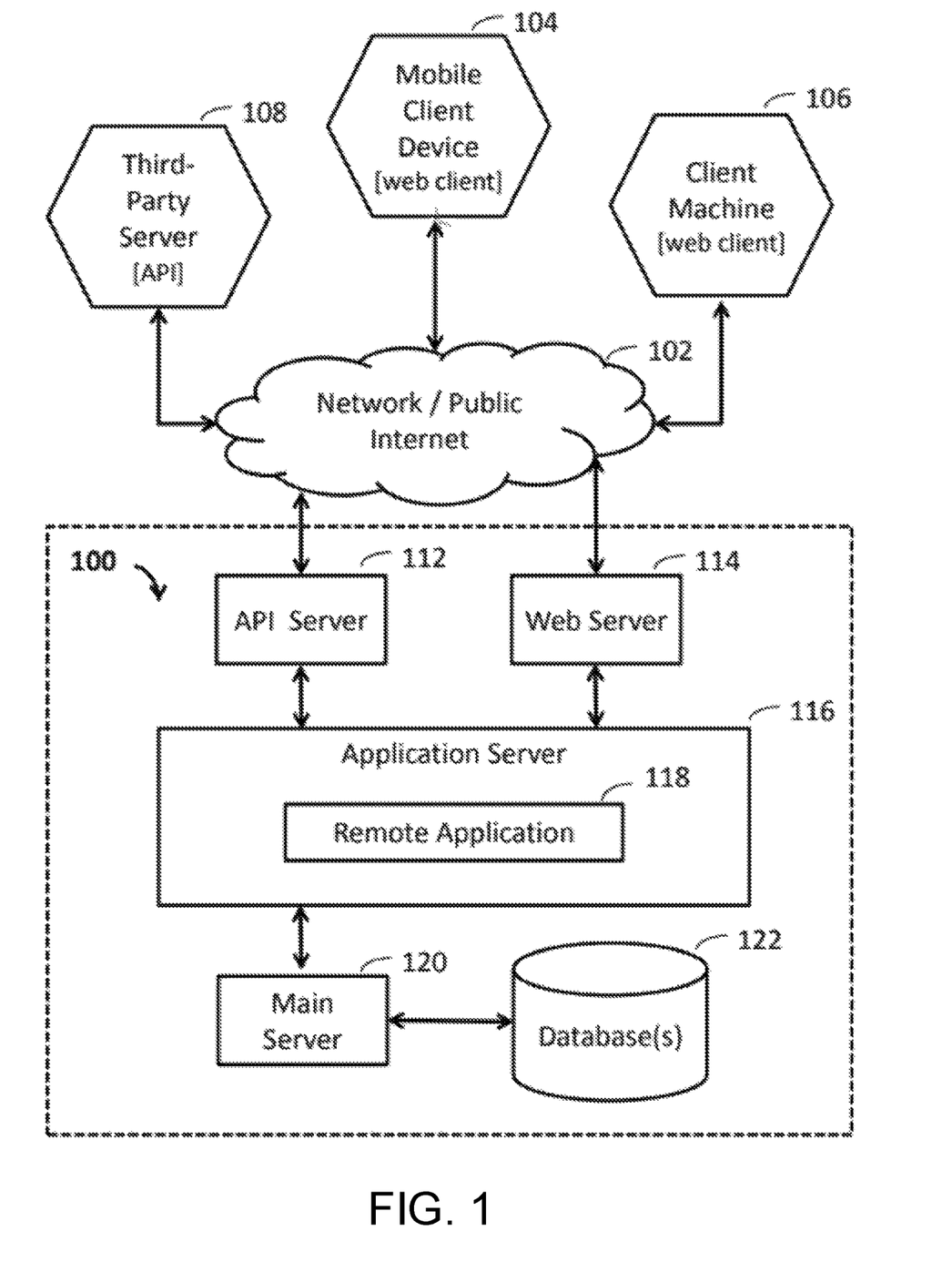
FIG. 1 depicts a diagram of a computer system, in accordance with an example.

As shown in FIG. 1, in one embodiment, a server computer system 100, a database 122 residing on a server, and interfaces to several wired and mobile clients 104, 106 capable of communicating with the server 100 via the network 102. The operation of the system as shown in FIG. 1, includes a computer system that comprises many functions. These functions can include one or more of an API server 112 and a Web server 114. Accordingly, both the API server 112 and the web server 114 are configured to connect to the network 102 as well as connect to a number of client computers. The main server 120 communicates with a database (s) 122 that stores the data described herein. The server computer system 100 connects over the network 102 to web clients 104 and 106. The client 104 is shown as a mobile client having a web client and the client 106 may be a general kind of client, having a web client that communicates via the network 102.

In some embodiments, the computer based system can comprise of one or more of a web server 114, API server 112, network 102, client computers and user devices, main server 120, application servers 116, remote application 118, third-party applications, mobile applications, a digital time token engine module and clock consisting of the methodology for generating and distributing digital tokens based on units of time. The system may additionally incorporate block chain technology, a transaction and messaging module for transferring time tokens as well as a token redemption platform to encourage user engagement in the form of positive communications, acts of kindness and pay it forward giving to other system users.

Figure 2:
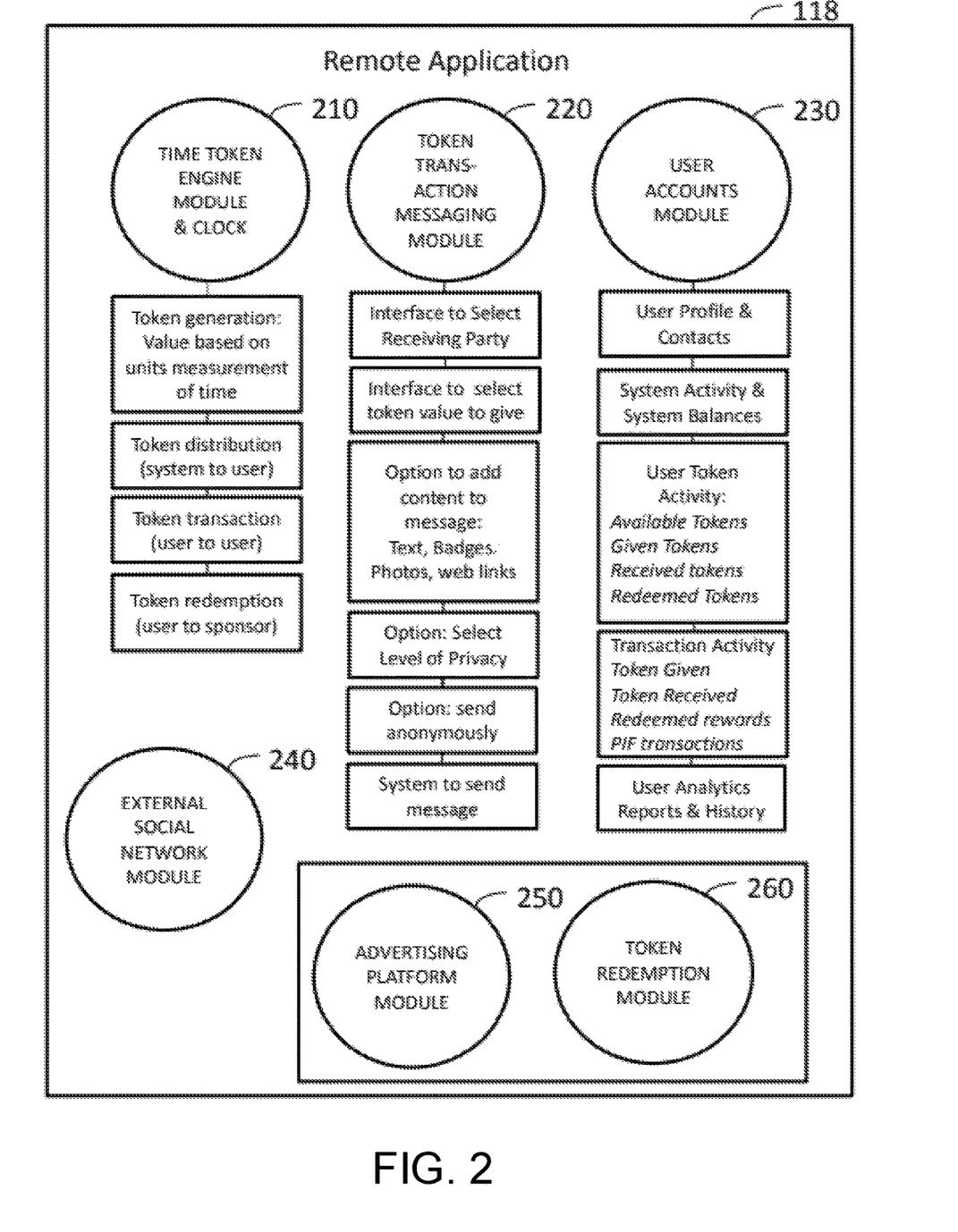
FIG. 2 depicts a block diagram of a remote application, in accordance with an example.

The operations are carried out by different functional modules which can be embodied with in a single computer program or in a separate computer program. In FIG. 2, these are shown as part of the remote application 118, residing on the application server 116. However, applications can be located on other servers. For example, FIG. 1 shows a third-party server 108 with a third-party application also connected to the Internet 102. The functional modules can be located within or communicating with this third-party server 108.

The functional modules include a time token engine module with system clock 210, a transaction messaging module 220, a user account module 230, an external social network module 240, an advertising platform module 250 and token redemption module 260. The modules are capable of collaborating between the internal systems and several external social networks to provide a means for sending electronic time tokens to system users, groups or sponsors. The database can also provide a history of all-time token transactions including tokens redeemed for digital items by the user or in a pay it forward transaction. As the term module is used throughout this document, it should be understood that this can be part of the single program, an individual program, a program running on a website or database, or any other functionality carried out in any way.

The token engine module 210 is responsible for generating time tokens based on system parameters, distributing tokens from system to users, managing tokens transactions from user to user or from a user to a specific topic and processing tokens resulting from redemption activity. The token transaction messaging module 220 allows users to initiate a transaction message and send a time token to any system user. The message transaction consists of; selecting the amount of time tokens to be awarded and transferred from the user to the message recipient. The user account module 230 manages all user account data including; user profile and preferences, time token balance activity, transaction messages activity and history, time token redemption activity, notification preferences and provides user activity metrics. The external social network module 240 may be used to link other social networks, such as Facebook, Instagram, Snap Chat, Twitter, Pinterest, etc., and to obtain information from those social networks. These connections may use available plug-in interfaces with existing social networks, or alternatively, may open the webpage of these social networks and obtain whatever personal information required based on the user's login credential. The time token redemption module 260 manages all time tokens received by users and exchanged for digital promotional items provided by sponsors via the advertising platform module 250 where advertising campaigns are initiated and managed by system sponsors.

The system is operable to enable individuals to give and exchange a representation of their time value with others system users and to facilitate quantifiable communication, via the platform's token transaction messaging system.

The transaction messaging system comprises of a method of signing up, registering new users and providing account login/password recovery to existing users. Users may register and access the system with an internet connection from various devices and by using a user account login/password.

The transaction messaging system can also comprise of one or more first time registered users that will be provided with a tutorial and a method to allow them to conveniently add their contact data from their mobile devices as well as third-party social networking websites to encourage system use.

The transaction messaging system can further comprise of a methodology where all active users will receive tokens from the time token engine module 210 which merit is based on the duration of time an individual has been a registered user of the system. The system automatically creates stores, distributes, and tracks all system token transactions between; the system and users, user to user and users to sponsors. The time token engine generates new tokens for each eligible active system user and deposits the tokens into their user account (explained in detail in FIG. 4). A unique property of the invention is the system's digital token value and creation methodology, which is based on a measurement of the user's system time. The system calculates and distributes time tokens to users for a defined unit of time that the user has been a system participant. Time tokens are created then transferred from the system's time token engine and deposited to all eligible users' accounts at defined system intervals, set by the system administrator.

One embodiment of the method to generate new tokens is for the system to create time tokens at a valuation equal to one minute of a user's system time and distribute time tokens to each active user account at an interval of 60 new tokens each system hour. This would give all active users the potential to receive a total of a 1440 time tokens a day, a total of 10,080 time tokens a week and a total of 525,600 time tokens a year, etc., as long as their account is in good standing and they are an active platform participant. System generated time tokens are deposited in each user account and utilization of at least one-time token is required to send a transaction message to another system user. The transaction message originator can send any amount of time tokens as long as the value does not exceed the sender's available time token balance. The system administrator may elect to set a maximum limit on a user's total available token balances and cease distributing new time token to an individual user if their balance reaches a certain threshold cap in order to encourage the user to give their time tokens in a transaction messages to others.

Additionally, the system database 122 architecture and user account module 230 is designed to provide real time user account data and provides various time token balances, transaction activity and metrics on the user as well as on the system level. Using a real time approach allows users to more efficiently interact with one another and to collaborate at a high level. The system transaction activity and metrics can comprise of one or more of the aforementioned indices or elements.

In one embodiment, one or more system to user time token transfers, consist of new time tokens created by the token engine module 210, and are distributed to all user's available time account. The user's available time account balance indicates how many time tokens are available to the account holder to give away and this balance is reduced at a 1:1 ratio whenever the user completes a transfer of available time tokens to another system user via the token transaction messaging module. If the user's available time balance is zero or the user's selects a time token value greater than their available balance, then the user will be notified that the time token transaction message has insufficient time tokens and the system will not complete the transaction message.

In another embodiment, a given balance is provided where there is a total number of time tokens given to other system users resulting from successful token transaction messages to others. The system will store the user's sent transactions history and message records sent to individual users, groups and/or topics. All token transaction messages given activity can be retrieved and view at a later time.

In one embodiment, the system database can provide for a received balance amount which indicates the total number of time tokens a system user has received from all other system users. The system will store all tokens transactions message records received from other users. All time token transactions messages received can be retrieved and view at a later time. Only received tokens may be redeemed by a user for sponsor's promotional items and rewards.

In one embodiment, there can be a time token transaction messaging module, where the system facilitates quantifiable communication between users through the exchange of time tokens via the system's token transaction messaging module 220. This messaging system consists of a communication interface that prompts the user to complete the following steps to send a time token transaction message.

Figure 3:
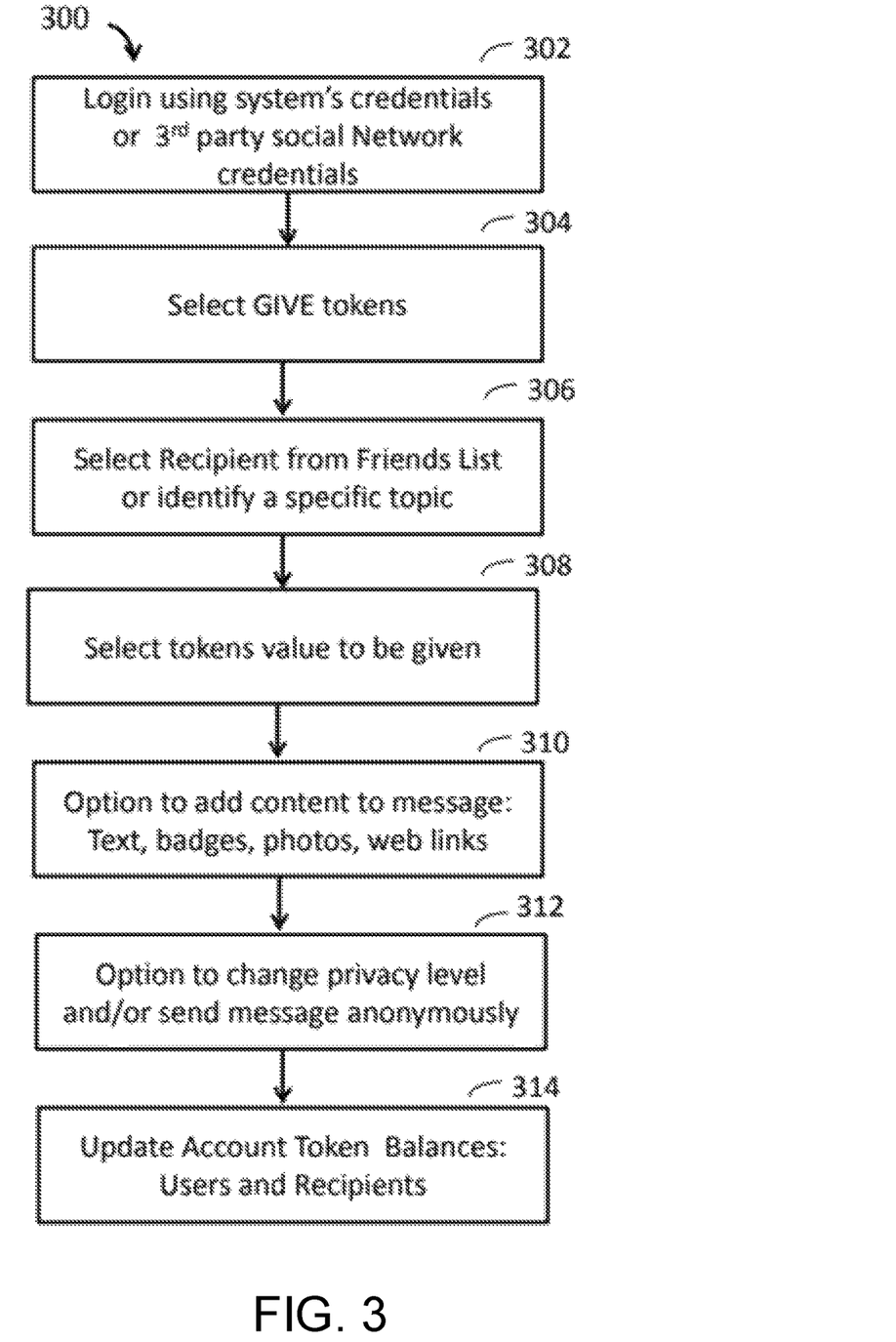
FIG. 3 is a flow diagram of sending a time token transaction message, in accordance with an example.

As shown in FIG. 3, for example, the user can log into the system directly or by using third party social network credentials 302. Additionally, the user can select a give tokens function 304. The user can then choose the recipient of the transaction message that will be given time tokens from the system's contact list or identifies a specific topic 306. The user can then assign a time token value amount to be transferred (given) to the recipient. The system interface is designed to allow the user to easily select the desired token amount and displays their available time token balance to ensure the user understands the maximum value they can send 308 for each transaction message initiated by a system user. The user is next provided an option to add creative content to their transaction message, which includes the following elements:

(a) keyboard interface to add text; and
(b) virtual badges depicting an award recognition type. The Badge categories will include but are not limited to:
  i. Awesome;
  ii. Brilliant;
  iii. Cool;
  iv. Love;
  v. Congrats;
  vi. Thanks;
  vii. WOW;
  viii. Wink;
  ix. YO/HELLO;
  x. HAHA;
  xi. Random Acts of Kindness; and
  xii. {blank}.
(c) tools to add, edit photo images and video clips; and
(d) web links 310.

In one embodiment, the system will prompt the user on the desired level of privacy they would like to use before the message is sent 312. The user will be offered three levels:
  i. Public mode—all system users can view the message
  ii. Friends mode—only flagged friends can view the message
  iii. Private mode—only the receiving party can view the message.

In one embodiment, the system will provide users with various user analytics reports that will be generated at the user level to track various system metrics; i.e. the total number of time tokens generated by the system and distributed to the user and current balance available to give; total number of tokens given by the user to other system users in the form of tokens transaction messages; total number of received tokens sent by other system users; total number of sponsored promotional items earned by redeeming received time tokens; total number of pay it forward transactions initiated by the user; total number of pay it forward transactions received from other users; distribution metrics based on virtual badge categories as well as other history and system user ranking data.

In one embodiment, another aspect of the disclosure consists of a sponsor interface and advertising platform module 250. The advertising platform allows approved sponsors the ability to display marketing content to system users; including the ability to create, publish and manage promotional campaigns that offer reward items that can be obtained by system users by redeeming their received time tokens via the token redemption module. Sponsors may also elect to send time tokens transaction messages directly to targeted users based on user profile and demographic data using time tokens collected from users.

In one embodiment, the time token redemption module 260 will allow users to redeem their tokens from their account's received balance only. Accordingly, received time tokens possessed by a user can be redeemed or exchange for items provided by sponsors and advertisers. The act of redeeming tokens for a sponsor offers and reward items will result in a user to sponsor token transfer. The token value of the desired item selected cannot exceed the user's total token received balance. The system will validate all users request, track all user to sponsor token transactions and provide digital receipts to users (refer FIG. 5). The system has a unique, Pay It Forward feature that allows a user to initiate an act of kindness by transferring their redeemed sponsor reward or promotional item in a pay it forward manner to another system user instead of keeping the item for their own consumption. The system also tracks all Pay It Forwards transfer transactions activity of all users.

In another embodiment, the system can include other conventional social networking features to facilitate social engagement by users, this may include but are not limited to; a user and word search function, content tagging, user comments; activity page and updates using push notification, profile editing, invite new user tools, content sharing tools, reporting of content that violates terms & conditions, etc.

Components of system described herein may be any combination of hardware and programming to implement the functionalities described herein. In some implementations, the programming may be processor executable instructions stored on a non-transitory machine-readable storage medium (e.g., memory), and the hardware may include at least one processing resource to retrieve and/or execute those instructions. Main Server may comprise of processor(s) which may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) thus may also include the functionality to encode messages and/or data or information. Processor(s) may include, among other things, a clock, an arithmetic logic unit (ALU) and logic gates configured to support operation of processor(s). Further, the processor(s) may include functionality to execute one or more software programs, which may be stored in the memory 106 or otherwise accessible to processor(s).

Memory, may store any number of pieces of information, and data, used by the system to implement the functions of the system. The memory may include for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory may be configured to store information, data, applications, instructions or the like for enabling the system to carry out various functions in accordance with various example embodiments. Additionally, or alternatively, the memory 1106 may be configured to store instructions which when executed by processor(s) causes the system to behave in a manner as described in various embodiments.

In one implementation, the network 102 may be a wireless network, a wired network or a combination thereof. The network 102 may be implemented as one of the several types of networks, such as intranet, local area network (LAN), wide area network (WAN), the internet, and the like. The network 102 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 102 may include a variety of network devices, including routers, bridges, servers, computing devices, storage devices, and the like.

Figure 4:
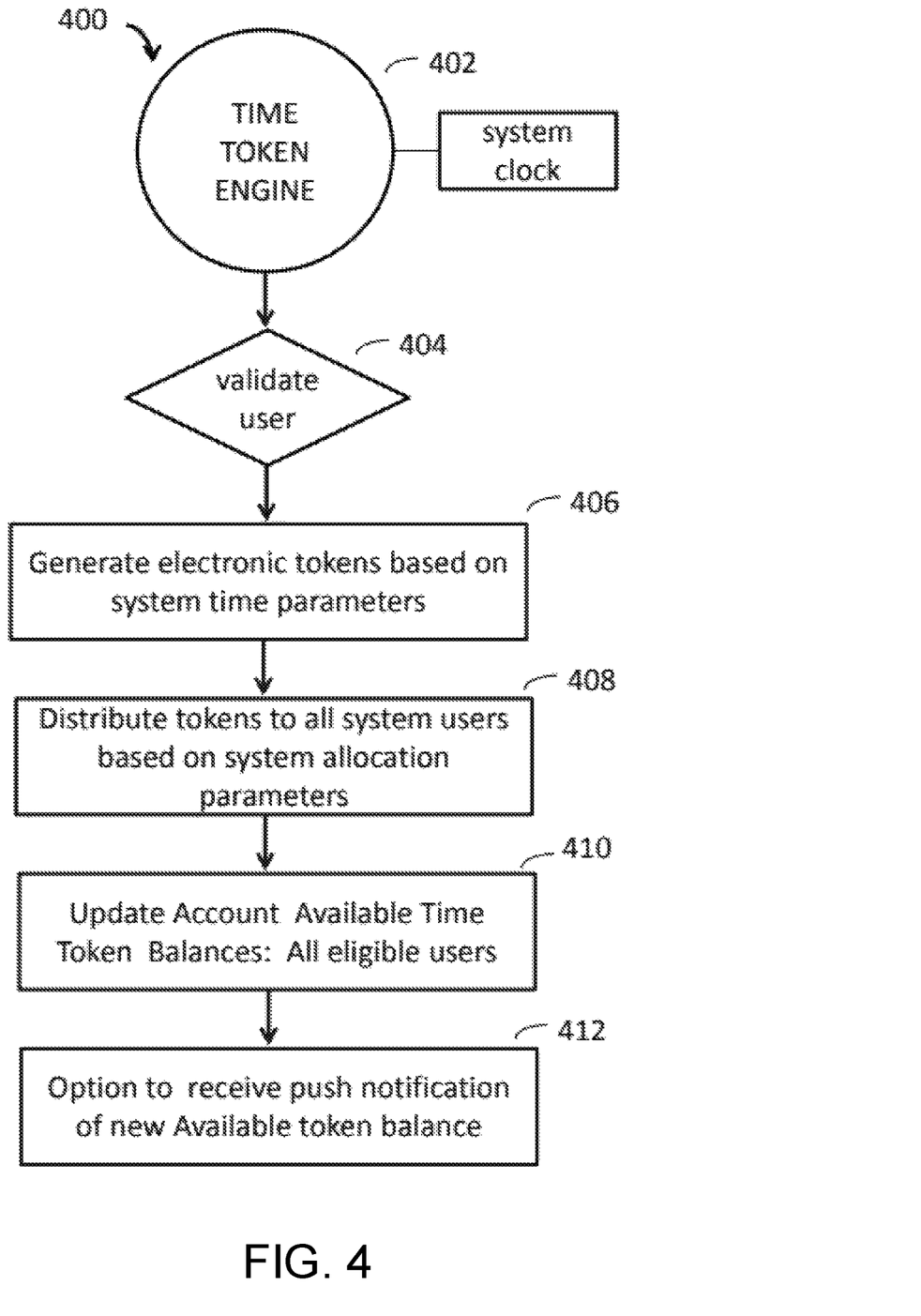
FIG. 4 is a flow diagram illustrating how time tokens are generated and distributed by the system's time token engine to users, in accordance with an example.
Figure 5:
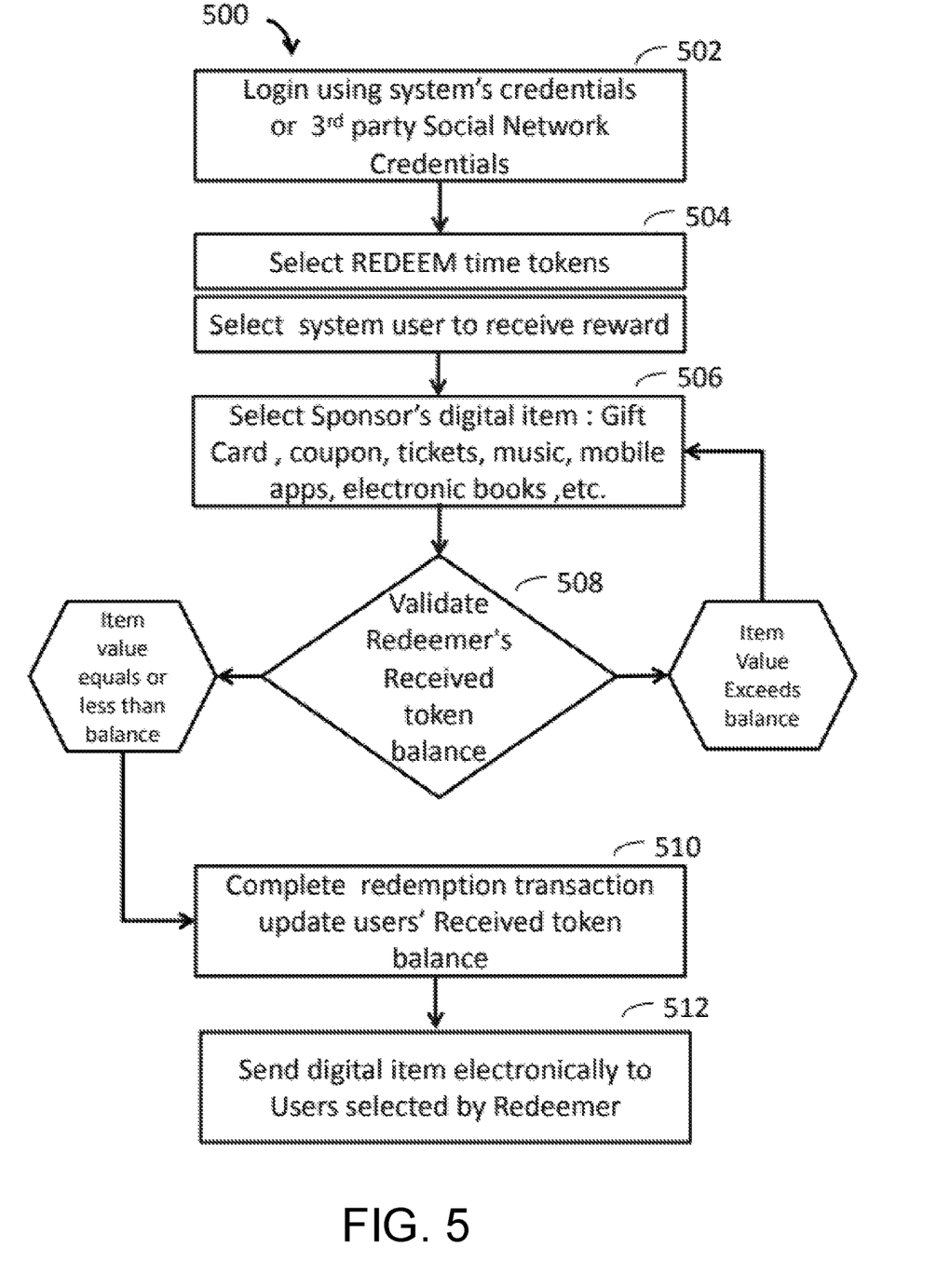
FIG. 5 is a flow diagram illustrating how time tokens are redeemed for a sponsored promotional item, in accordance with an example.

The process depicted in FIGS. 3-5 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Although the present invention has been described in terms of various embodiments, it is not intended that the invention be limited to these embodiments. Modification within the spirit of the invention will be apparent to those skilled in the art. For example, the server system assigns one or more tokens to one or more users based off of a user interaction. The server system can then allow the user to identify whether to receive or send one or more tokens based off of their available account balance.

What is claimed is:

1. A method of operation using recorded system user time to generate one or more digital tokens for transmission comprising: connecting to a computer-based system via a set of login credentials; selecting one or more tokens to send to one or more users; selecting one or more users as recipients; determining a value of the one or more tokens to be sent to the one or more users; inputting a set of content into a message associated with the one or more tokens; and updating one or more account balances for the one or more users and/or recipients, wherein the user time is recorded by a system clock, wherein tokens generated by the system are allocated to each user upon account creation through a registration process, and these tokens automatically accumulate at a consistent value and at regular intervals, requiring no further action from the user, wherein the system clock is configured to distribute digital tokens based on units of time as a result of reaching a predetermined time period, wherein the platform's token transaction messaging system facilitates positive and quantifiable communications between platform users by allowing users to give digital tokens representing a unit of their time to other users, wherein system parameters require the utilization of system generated tokens for sending transaction messages, wherein tokens sent in a transaction message, once received and transferred into the recipient's user account's received balance, undergo a utility transformation from system generated tokens that facilitate quantifiable communications to conversion to a new token utility that allows for the exchange of only received tokens for redeemable items, wherein the token redemption module manages all tokens received by users, which can be exchanged for items provided by platform sponsors, and wherein received tokens are dedicated solely to redemption with platform sponsors, with no mechanism allowing them to revert to their original system generated form.

2. The method of claim 1, wherein the set of content is configured to be one or more of text, one or more badges, one or more photos, or one or more web links.

3. The method of claim 1, wherein the one or more recipients is selected from a friends list, system user list or a categorical topic list.

4. A method of operation of a time token engine comprising the steps of: validating a set of credentials of one or more users upon receiving an input; generating one or more electronic tokens based on an individual user time; distributing one or more electronic tokens to the one or more users based on a set of system allocation parameters; and updating an account comprising of an available, received and given token balances for each of the one or more users, wherein the time token engine is configured to be operated by a system clock, wherein tokens generated by the system are allocated to each user upon account creation through a registration process, and these tokens automatically accumulate at a consistent value and at regular intervals, requiring no further action from the user, wherein the system clock is configured to distribute digital tokens based on units of time as a result of reaching a predetermined time period, wherein the platform's token transaction messaging system facilitates positive and quantifiable communications between platform users by allowing users to give digital tokens representing a unit of their time to other users, wherein system parameters require the utilization of system generated tokens for sending transaction messages, wherein tokens sent in a transaction message, once received and transferred into the recipient's user account's received balance, undergo a utility transformation from system generated tokens that facilitate quantifiable communications to conversion to a new token utility that allows for the exchange of only received tokens for redeemable items, wherein the token redemption module manages all tokens received by users, which can be exchanged for items provided by platform sponsors, and wherein received tokens are dedicated solely to redemption with platform sponsors, with no mechanism allowing them to revert to their original system generated form.

5. The method of claim 4, wherein the updating an account comprising an available time token balance for each of the one or more users comprises selecting a category of the one or more users to update the available time token balance.

6. The method of claim 4, wherein the available time token balance indicates how many time tokens are available to the account holder to give away.

7. The method of claim 4, wherein the one or more users are notified if the available time token balance is zero, or a user of the one or more user's selects a time token value greater than the available balance.

8. The method of claim 4, wherein the given token balance is the total number of time tokens given to another user in the one or more users resulting from a successful token transaction message.

9. The method of claim 4, wherein the received token balance is the total number of time tokens a user in the one or more users has received from other users in the one or more users.

10. A system, comprising: at least one processor; and at least one non-transitory computer readable storage medium storing instructions thereon that, when executed by the at least one processor, cause a time token engine to: validate a set of credentials of one or more users upon receiving an input; generate one or more electronic tokens based on an individual user time; distribute one or more electronic tokens to the one or more users based on a set of system allocation parameters; and update an account comprising of an available time token balance, a received token balance and a given token balance for each of the one or more users, wherein the time token engine is configured to be operated by a system clock, wherein tokens generated by the system are allocated to each user upon account creation through a registration process, and these tokens automatically accumulate at a consistent value and at regular intervals, requiring no further action from the user, wherein the system clock is configured to distribute digital tokens based on units of time as a result of reaching a predetermined time period, wherein the platform's token transaction messaging system facilitates positive and quantifiable communications between platform users by allowing users to give digital tokens representing a unit of their time to other users, wherein system parameters require the utilization of system generated tokens for sending transaction messages, wherein tokens sent in a transaction message, once received and transferred into the recipient's user account's received balance, undergo a utility transformation from system generated tokens that facilitate quantifiable communications to conversion to a new token utility that allows for the exchange of only received tokens for redeemable items, wherein the token redemption module manages all tokens received by users, which can be exchanged for items provided by platform sponsors, and wherein received tokens are dedicated solely to redemption with platform sponsors, with no mechanism allowing them to revert to their original system generated form.

11. The system of claim 10, wherein the updating an account comprising an available time token balance for each of the one or more users comprises selecting a category of the one or more users to update the available time token balance.

12. The system of claim 10, wherein the available time token balance indicates how many time tokens are available to the account holder to give away.

13. The system of claim 10, wherein the one or more users are notified if the available time token balance is zero, or a user of the one or more user's selects a time token value greater than the available balance.

14. The system of claim 10, wherein the given token balance is the total number of time tokens given to another user in the one or more users resulting from a successful token transaction message.

15. The system of claim 10, wherein the received token balance is the total number of time tokens a user in the one or more users has received from other users in the one or more users.

* * * * *